United States Patent
Tanaka

(10) Patent No.: US 9,616,786 B2
(45) Date of Patent: Apr. 11, 2017

(54) VEHICLE SEAT

(71) Applicant: TOYOTA BOSHOKU KABUSHIKI KAISHA, Aichi-ken (JP)

(72) Inventor: Kengo Tanaka, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 253 days.

(21) Appl. No.: 14/505,817

(22) Filed: Oct. 3, 2014

(65) Prior Publication Data

US 2015/0097406 A1    Apr. 9, 2015

(30) Foreign Application Priority Data

Oct. 4, 2013   (JP) ................... 2013-209311

(51) Int. Cl.
 *B60N 2/46* (2006.01)
 *B60N 3/10* (2006.01)
 *B60N 2/58* (2006.01)

(52) U.S. Cl.
 CPC ......... *B60N 2/4613* (2013.01); *B60N 2/5816* (2013.01); *B60N 3/102* (2013.01)

(58) Field of Classification Search
 None
 See application file for complete search history.

(56) References Cited

U.S. PATENT DOCUMENTS

| | | | |
|---|---|---|---|
| 5,660,433 A | 8/1997 | Bruhnke et al. | |
| 6,073,996 A * | 6/2000 | Hatsuta | B60N 2/4613 156/213 |
| 6,217,112 B1 * | 4/2001 | Linsenmeier | B60N 2/4686 297/113 |
| 2004/0140697 A1 * | 7/2004 | Yuhki | B60N 2/4686 297/113 |
| 2015/0191112 A1 * | 7/2015 | Kawashima | A47C 7/40 297/188.07 |

FOREIGN PATENT DOCUMENTS

| | | | | |
|---|---|---|---|---|
| DE | 19511135 C1 * | 4/1996 | | B60N 2/4613 |
| DE | 102007049763 A1 * | 4/2009 | | B60N 2/4613 |
| JP | 4-023454 | 2/1992 | | |
| JP | 2002186542 A | 7/2002 | | |
| JP | 2003212023 A | 7/2003 | | |

OTHER PUBLICATIONS

Japanese Office Action issued for Japanese Application No. 2013-209311, dated Nov. 1, 2016.

* cited by examiner

*Primary Examiner* — David E Allred
(74) *Attorney, Agent, or Firm* — Greenblum & Bernstein, P.L.C.

(57) ABSTRACT

A vehicle seat having a tiltable unit provided in a receiving recess formed in a seatback, the vehicle seat including a stopper structure configured to keep the tiltable unit in the receiving recess, wherein the stopper structure is configured so that a protrusion piece provided to one of an inner peripheral part of the receiving recess and an outer peripheral part of the tiltable unit is pressed against the other, and wherein the protrusion piece is arranged to be sandwiched between a seat cover, which covers a general plane of the one of the inner peripheral part of the receiving recess and the outer peripheral part of the tiltable unit, and a seat pad covered with the seat cover, and the protrusion piece forms a protrusion shape protruding further than the general plane and pressed against the other.

9 Claims, 10 Drawing Sheets

VEHICLE SEAT

CROSS-REFERENCE TO RELATED APPLICATIONS

This application claims priority from Japanese Patent Application No. 2013-209311 filed on Oct. 4, 2013, the entire contents of which are incorporated herein by reference.

TECHNICAL FIELD

The present invention relates to a vehicle seat. In particularly, the invention relates to a vehicle seat having a tiltable unit which is provided in a receiving recess formed in a seatback and is usable by being tilted forward from the receiving recess.

BACKGROUND

As a rear seat of a vehicle, one is known in which a tiltable unit adapted to be tilted to be used as an armrest or a table is provided in a middle seatback region of a three-seater seat (see JP-U-H04-23454). When not used, the tiltable unit is accommodated into a receiving recess formed in the seatback and thus is maintained in a state of forming a back resting surface flushed with the seatback. Also, by pulling forward a grip attached to the tiltable unit, the tiltable unit is adapted to be tilted from the accommodated state to a spread state where the tiltable unit can be used as an armrest or a table. In addition, a stopper structure is provided between the receiving recess of the seatback and the tiltable unit, so that the tiltable unit can be kept locked in the receiving recess without coming out from the receiving recess when the vehicle is suddenly braked or when the seatback is erected from a forward tilted position, or the like. The stopper structure is adapted to be released from such a locked state by an operation of pulling forward the grip attached to the tiltable unit.

SUMMARY

However, according to the above-described related art, the stopper structure is provided to partially angularly protrude from each of the receiving recess of the seatback and the tiltable unit, and therefore a surface of the seatback or the tiltable unit tends to be damaged, and further, appearance thereof when being exposed to the exterior becomes poor. The present invention is devised to solve the above problems and accordingly, an object of the invention is to provide a vehicle seat in which a stopper structure for keeping a tiltable unit fixed in a receiving recess of a seat back hardly damages a corresponding member and also has a fine appearance when being exposed to the exterior.

To solve the above-described problem, a vehicle seat according to the present invention includes the following aspect.

According to an aspect of the present invention, there is provided a vehicle seat having a tiltable unit which is provided in a receiving recess formed in a seatback and is usable by being titled forward from the receiving recess, the vehicle seat including: a stopper structure configured to keep the tiltable unit to be accommodated in the receiving recess; wherein the stopper structure is configured so that a protrusion piece provided to one of an inner peripheral part of the receiving recess and an outer peripheral part of the tiltable unit is pressed against the other of the inner peripheral part of the receiving recess and the outer peripheral part of the tiltable unit to apply a locking force for holding the tiltable unit in the receiving recess, and wherein the protrusion piece is arranged to be sandwiched between a seat cover, which is stretched to cover a general plane of the one of the inner peripheral part of the receiving recess and the outer peripheral part of the tiltable unit to which the protrusion piece is provided, and a seat pad covered with the seat cover, and the protrusion piece forms a protrusion shape protruding further than the general plane and pressed against the other of the inner peripheral part of the receiving recess and the outer peripheral part of the tiltable unit.

Accordingly, the protrusion shape of the protrusion piece becomes even by a shape of the seat cover stretched on a surface thereof, so that the protrusion shape hardly becomes a shape partially protruding with respect to the exterior. Therefore, the stopper structure can be configured to hardly damage the corresponding member and also to provide a fine appearance when being exposed to the exterior.

DETAILED DESCRIPTION

Modes for embodying the present inventions will be now described with reference to the accompanying drawings.

Embodiment 1

Figure 1:
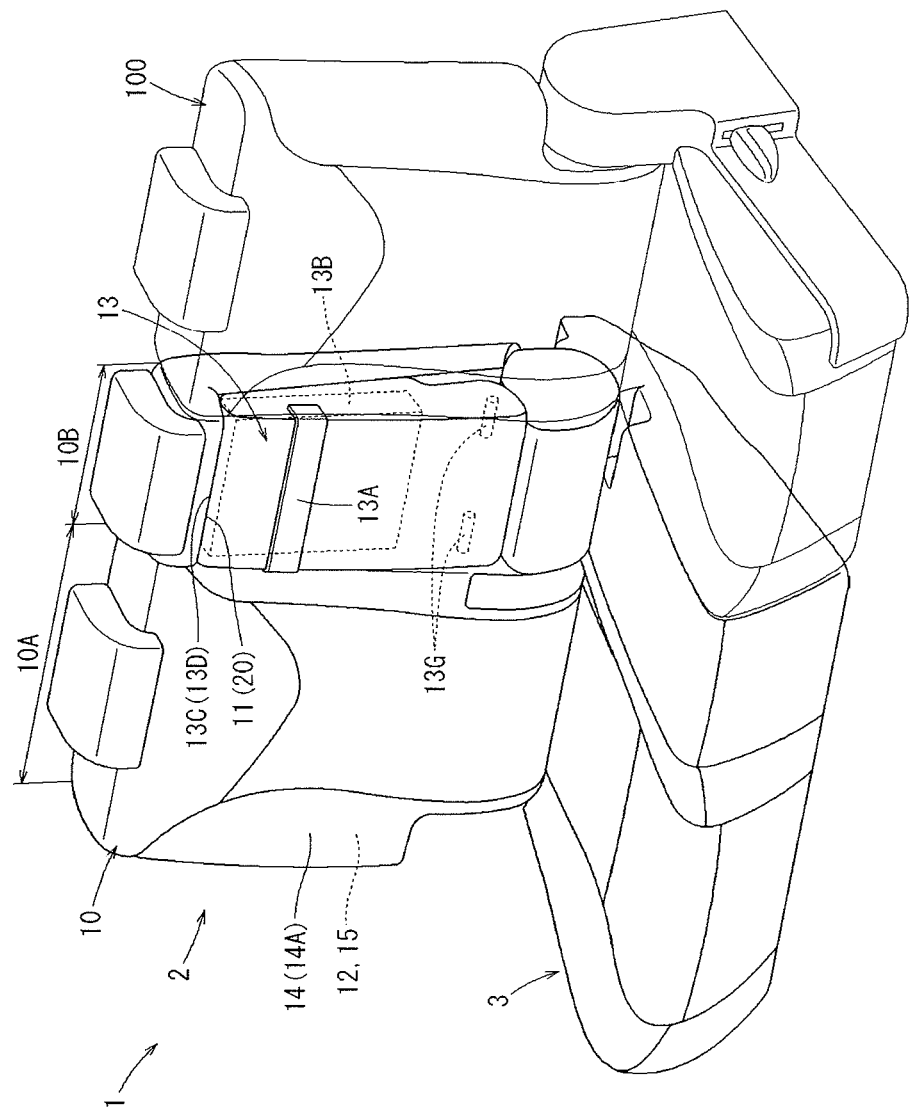
FIG. 1 is a perspective view showing a schematic configuration of a vehicle seat according to an embodiment 1.

First, configurations of a seat 1 of the embodiment 1 will be described with reference to FIGS. 1 to 10. As shown in FIG. 1, the seat 1 of the present embodiment is constituted as a rear seat of the last row mounted in a so-called station wagon-type automobile. The seat 1 is configured to have a long width allowing three passengers to sit on the same row and to be continued to a luggage compartment of the automobile formed on a rear side thereof.

The seat 1 has a seatback 2 adapted to rest a seated passenger's back thereon, a seat cushion 3 serving as a seating portion, and a headrest 4 adapted to rest a head thereon. The seatback 2 is divided in a ratio of 6:4 in a width direction into a two-seater seatback 10 and a one-seater seatback 100. The two-seater seatback 10 and the one-seater seatback 100 are configured such that backrest angles thereof can be separately adjusted and that they can be separately tilted forward toward the seat cushion 3. The seat cushion 3 is configured as a unitary body having a width for three seaters without being divided in a seat width direction. One headrest 4 is mounted on each of an upper part of a middle seat region 10B and an upper part of a side seat region 10A of the two-seater seatback 10 and an upper part of the one-seater seatback 100.

The two-seater seatback 10 as described above, as shown in FIG. 5, is configured so that the middle seat region 10B is narrower than the side seat region 10A. Also, the middle seat region 10B is provided with an armrest 13, which can be tilted forward from the two-seater seatback 10 and can be used as a location allowing an elbow to be placed thereon when no passenger sits on the region 10B (see FIG. 2). As shown in FIG. 1, the armrest 13 is provided to be accommodated into a receiving recess 11 formed in the center seat region 10B of the two-seater seatback 10. When having been accommodated into the receiving recess 11, the armrest 13 is flushed with a backrest surface of the two-seater seatback 10 and can serve as a backrest for a passenger seated on the middle seat region 10B. Herein, the armrest 13 as described above corresponds to a 'tiltable unit' of the present invention.

Figure 2:
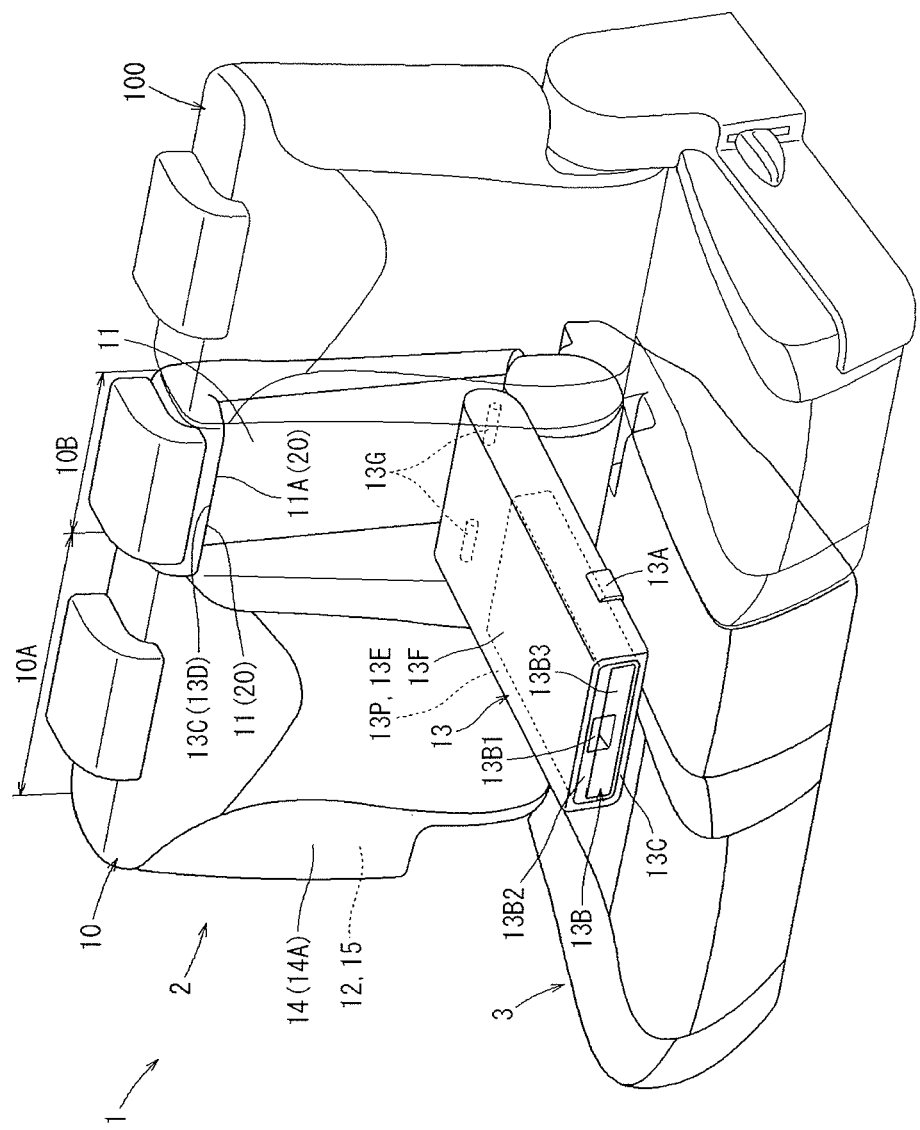
FIG. 2 is a perspective view showing a state where an armrest (tiltable unit) is tilted forward.

The armrest 13 is tilted to a horizontal position, as shown in FIG. 2, by tilting forward from the receiving recess 11 as described above and thus can become a state (spread state) where the armrest 13 can be comfortably used as a location on which passengers on both left and right sides thereof can place their elbows. In the spread state shown in FIG. 2, also, the armrest 13 is adapted so that a cup holder 13B can be drawn-out forward from a distal end surface portion 13C thereof facing a front side of the seat by an operation of pushing a pushing button 13B1 provided on the surface portion 13C. Herein, the cup holder 13B as described above corresponds to an 'equipment' of the present invention.

The cup holder 13B is provided in an embedded state over more than half of the armrest 13 extending from the distal end surface portion 13C of the armrest 13 up to a base portion (pivot shaft 13G) which is a pivoting center thereof. Specifically, the cup holder 13B is constituted of a rectangular frame-shaped frame portion 13B2 exposed from the distal end surface portion 13C of the armrest 13 as described above, a holder portion 13B3 embedded in the armrest 13 while being received in the frame portion 13B2, and the pushing button 13B1 provided on a part region of the frame portion 13B2.

Figure 6:
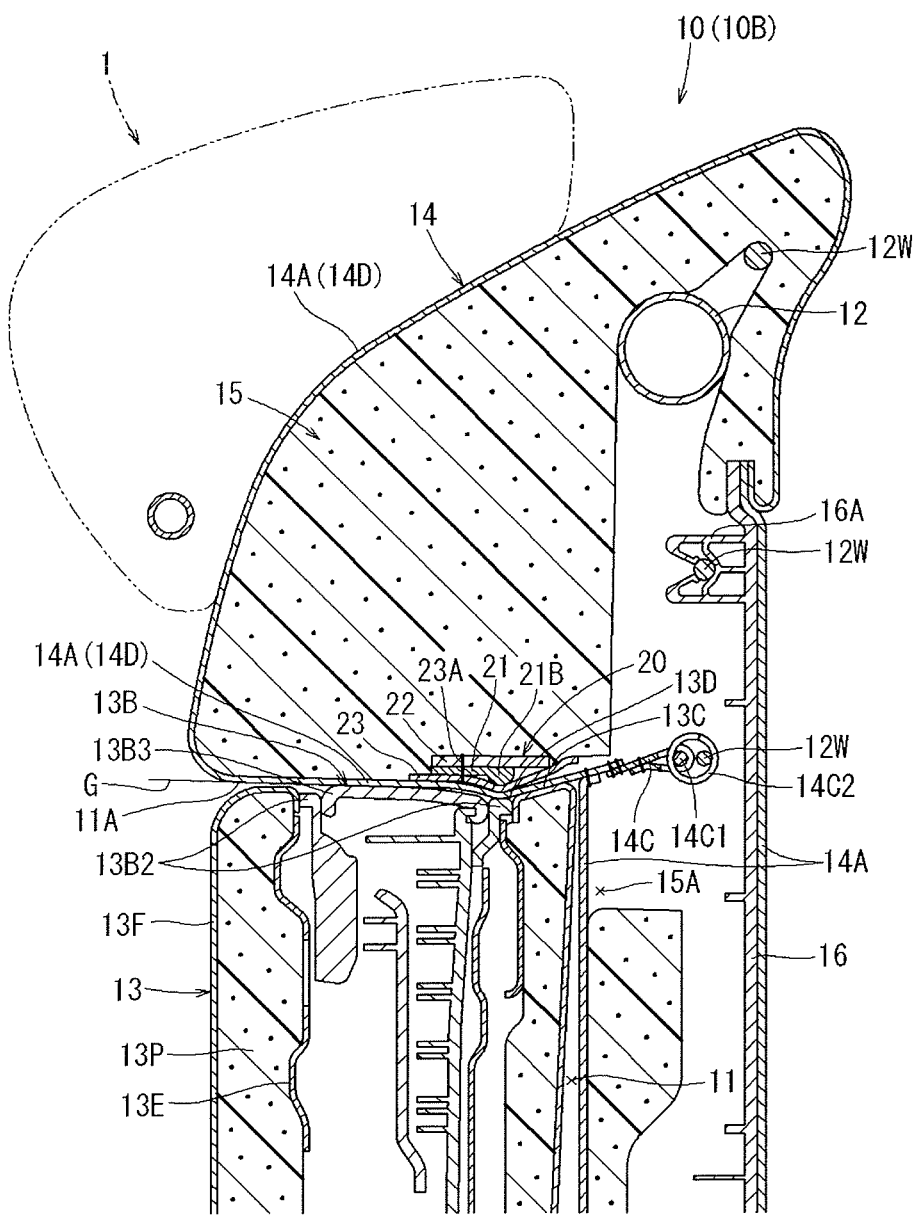
FIG. 6 is a sectional view taken along a line VI-VI in FIG. 5.

As shown in FIG. 6, the frame portion 13B2 is provided to be integrally fixed to an arm frame 13E, which is made of metal and is a framework of the armrest 13. A surface part of the frame portion 13B2, which is exposed from the distal end surface portion 13C of the armrest 13, is formed by a resin member. Also, the holder portion 13B3 is provided to be supported by the frame portion 13B2 to be spreadable and accommodatable with respect thereto, and in a non-used state, is pressed into the armrest 13 in a state where a spreading movement thereof is regulated, and thus is maintained in a flat surface shape flushed with the frame portion 13B2 as described above. The holder portion 13B3 is adapted to be released from the regulated state thereof at the accommodated position by pushing the pushing button 13B1 as described above and then to be drawn-out and spread from the distal end surface portion 13C of the armrest 13 by urging action of a spring, not shown. Also, after being spread, the holder portion 13B can be converted into a form, in which a drink container can be held, by a manual operation and thus becomes in a state where a drink container can be set from an upper side thereof and held thereon.

The armrest 13 as described above is adapted so that, as shown in FIG. 6, a locking force from a stopper structure 20 provided to a ceiling surface portion 11A of the receiving recess 11 is applied thereon by accommodating the holder portion 13B3 of the cup holder 13B into the armrest 13 and then erecting the armrest 13 rearward to be fully pressed into the receiving recess 11. Thus, the armrest 13 can be kept strongly pressed and fixed to the receiving recess 11. In this way, the armrest 13 is held by the stopper structure 20 and thus can be kept strongly held in place in the receiving recess 11 without coming out from the receiving recess 11 when the automobile is suddenly braked or when the two-seater seatback 10 is erected from a forward tilted state, or the like.

Specifically, as described above with reference to FIG. 2, the armrest 13 has a configuration in which the cup holder 13B is equipped in a distal end-side region thereof so that the distal end side is heavier, and as a result thereof, has a configuration in which action of an inertial force as described above is likely to be strongly applied thereto. However, even if action of the strong inertia force as described above is applied, the armrest 13 is stably held in place in the receiving recess 11 by a strong locking force exerted by the stopper structure 20 as described above.

Next, a configuration of each component of the two-seater seatback 10 as described above will be described in detail. As shown in FIG. 6, the two-seater seatback 10 includes a back frame 12 made of metal and constituting a framework thereof, a back pad 15 made of foamed urethane and covering a front part of the back frame 12 to alleviate and support a load of a passenger seated thereon, a back cover 14 covering the entire surface of the back pad 15, and a back board 16 made of resin and covering a rear part of the back frame 12. Herein, the back cover 14 as described above corresponds to a 'seat cover' of the present invention and the back pad 15 corresponds to a 'seat pad' of the invention.

The back frame 12 is made in a rectangular fame shape to conform to an outer peripheral shape of the two-seater seatback 10 although not shown in detail. The back frame 12 is provided with a wire 12W integrally coupled thereto for mounting various components as described below. The back pad 15 is mounted to cover each frame part of the back frame 12 from a front side and also mounted so that a peripheral edge thereof extends rearward in a finny shape to cover each frame part of the back frame from an outer peripheral side.

The back cover is configured so that a plurality of component pieces 14A formed to correspond to a shape of each side of the back pad 15 are sewn to each other in a shape of one bag conforming to a surface shape of the back pad 15. For each component piece 14A, leather material or carpet material is selectively used depending upon a location on the back pad 15 to be covered thereby. Specifically, each component piece 14A intended to cover a front surface of the receiving recess 11, into which the armrest 13 is accommodated, a transversal side surface of the center seat region 10B, and a rear surface of the back board 16, is made of carpet material and the others is made of leather material. Meanwhile, as skin material used for each component piece 14A, other surface materials, such as fabrics, may be used in addition to leather material and carpet material, and also selections depending upon locations to be applied may be properly freely changed.

After the back cover 14 is covered on the surface of the back pad 15 from the front side, each peripheral edge on upper, lower, left and right sides thereof is drawn rearward and fixed to the back frame 12. Thus, the back cover 14 is stretched in a state where both upper and lower sides and also both left and right sides thereof is pulled and covered to be broadly and tightly contacted with the surface shape of the back pad 15. By such stretching of the back cover 14, the back pad 15 is strongly pressed against the back frame 12 to be fixed in place thereto.

Figure 3:
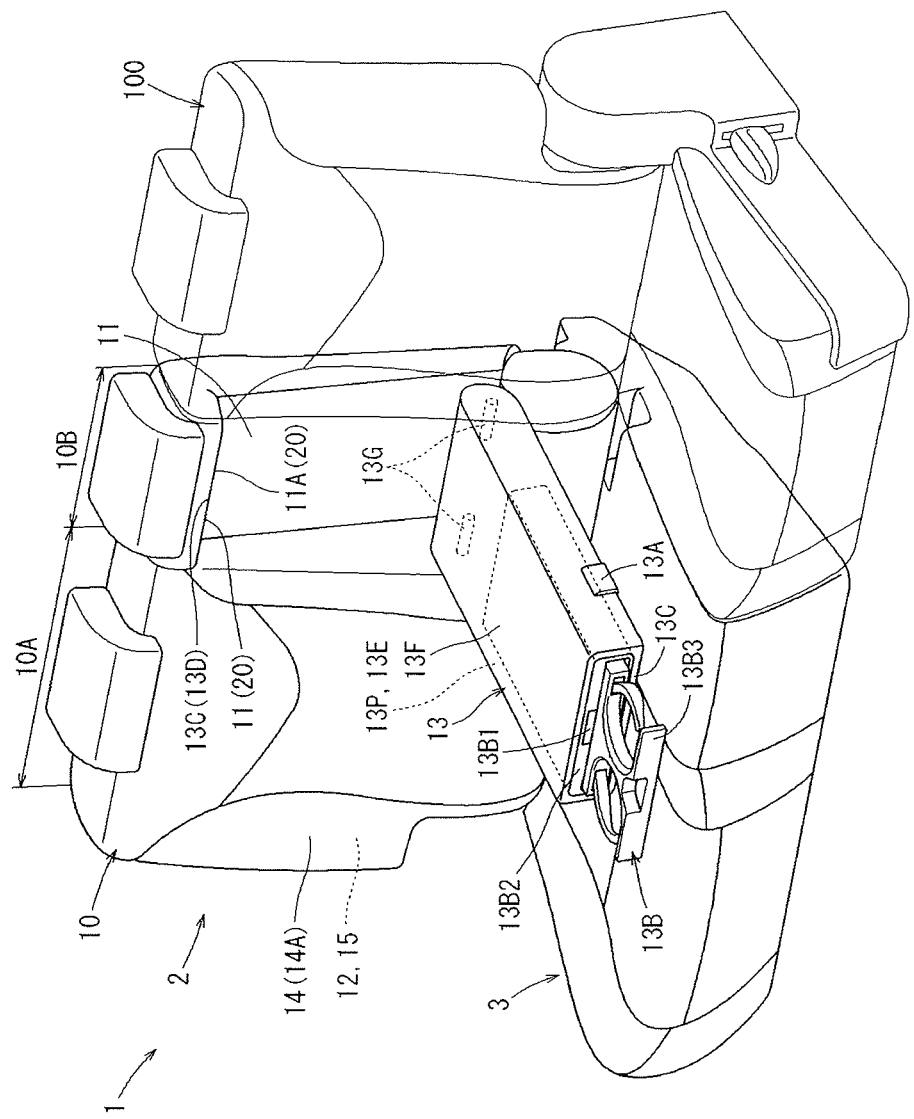
FIG. 3 is a perspective view showing a state where a cup holder is drawn-out.
Figure 4:
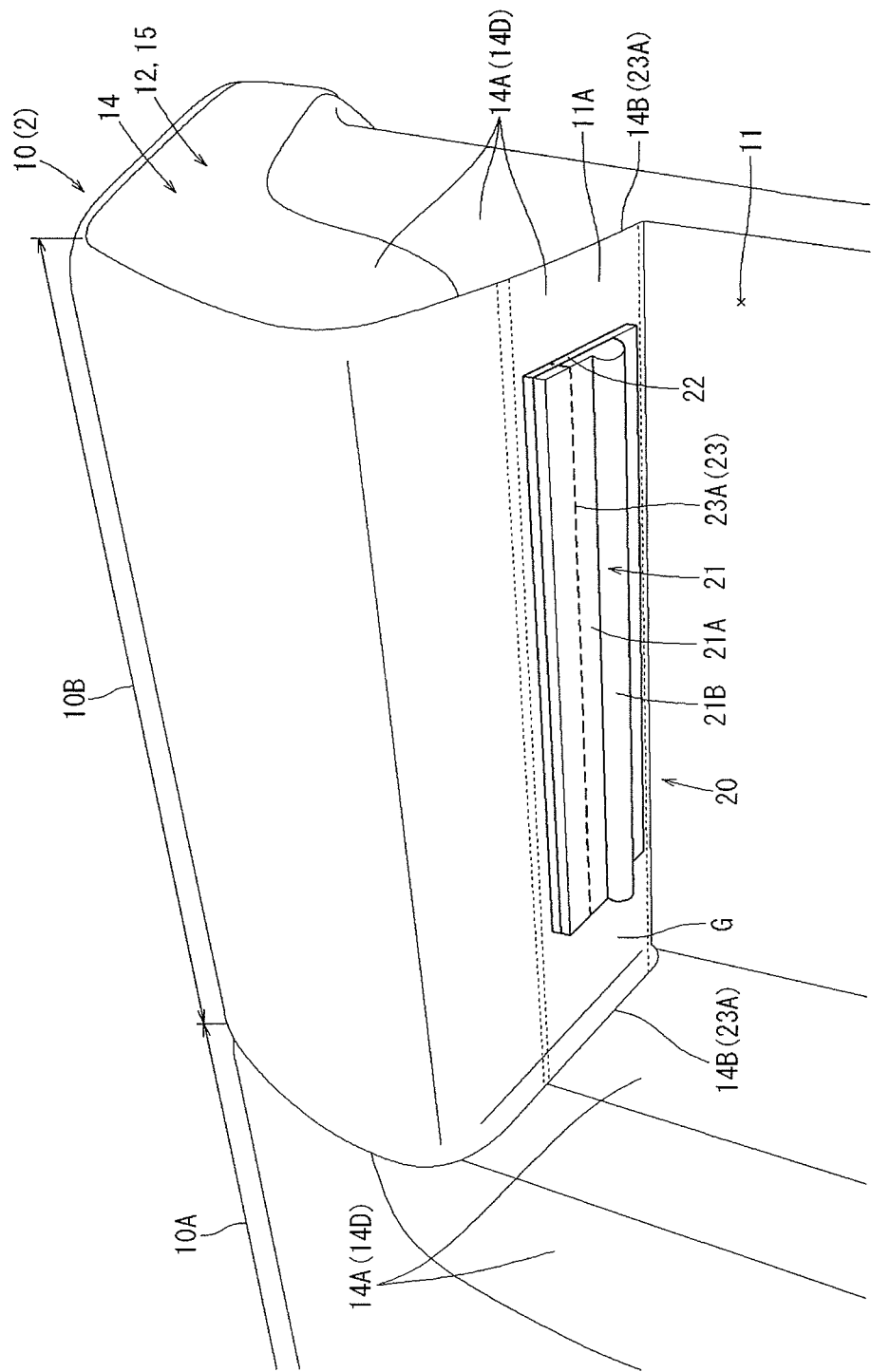
FIG. 4 is an enlarged perspective view showing a region where a stopper structure is disposed, as viewed from a lower side thereof.
Figure 5:
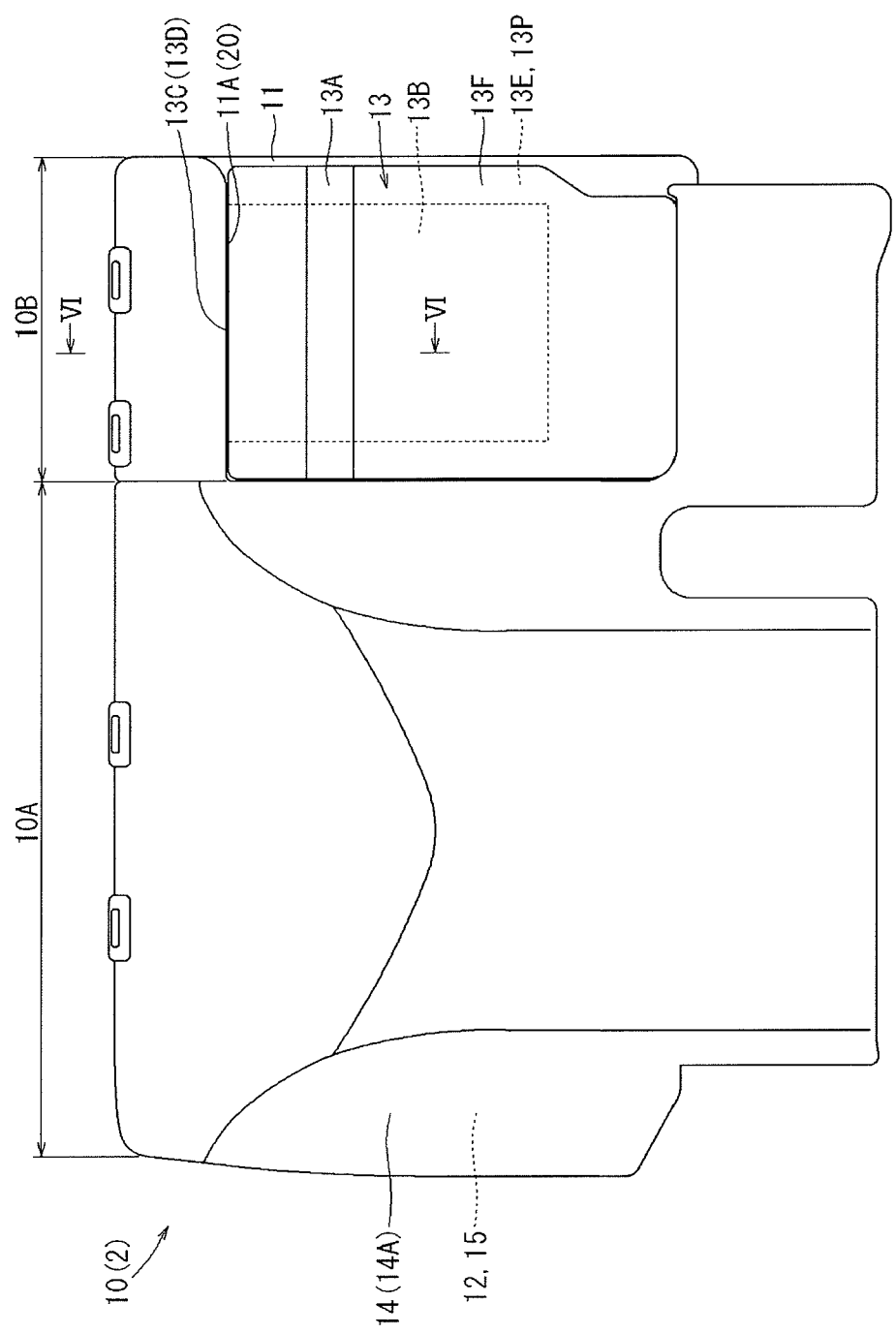
FIG. 5 is a front view of a vehicle seat.

Also, as shown in FIGS. 2 to 4, a surface region of the back cover 14, which is intended to cover the receiving recess 11, is sewn in a concave surface shape which is recessed to correspond to a shape of the receiving recess 11. In the surface region of the back cover 14 sewn in the concave surface shape, as shown in FIG. 6, back sides of an upper inner edge (right upper side in the figure) and a lower inner edge (not shown) of the concave surface are respectively sewn with suspending fabrics 14C for suspending the inner edges rearward. The suspending fabrics 14C are respectively drawn rearward through through-holes 15A formed to extend through the back pad 15, and then the wire 14C1 is passed through distal end edges of the suspending fabrics 14C and is fastened and fixed by C-rings 14C2 to be closed to the wire 12W coupled to the back frame 12 as described above. Therefore, the surface region of the back cover 14 sewn in the concave surface shape becomes in a stretched state where the surface region is broadly and tightly contacted with a concave surface of the back pad 15, by which the receiving recess 11 is formed, without floating or wrinkling. A foamed urethane cover pad 14D (not shown) for preventing a slip of the back cover 14 or improving cushioning ability thereof is provided to be integrally laminated on a back surface part of each component piece 14A of the back cover 14 as described above.

The back board 16 is inserted into a plurality of locations on the back frame 12 from a rear side thereof by using clips 16A and thus is integrally mounted on the back frame 12. A rear surface part of the back board 16 is covered with a component piece 14A made of carpet material constituting the back cover 14 as described above. Due to this configuration, the carpet material (component piece 14A) covered on the rear surface of the back board 16 forms a luggage compartment surface flushed with carpet material spread on a floor surface of the luggage compartment, when the two-seater seatback 10 is tilted forward. The back surface part of the two-seater seatback 10 covered with carpet material is configured to exhibit such a high structural strength that the back surface part is hardly bent even if a luggage is placed thereon, because the back board 16 is equipped inside thereof.

As shown in FIG. 6, the armrest 13 includes an arm frame 13E made of metal and constituting a framework thereof, an arm pad 13P made of foamed urethane and covering the entire surface of the arm frame 13E to alleviate and support a load exerted from the exterior, an arm cover 13F made of leather material and covering the entire surface of the arm pad 13P, a strip-shaped band 13A made of leather material and sewn on the arm cover 13F, and the cup holder 13B equipped in the armrest 13.

The armrest 13 as described above is connected, at two left and right parts on a base side of the arm frame 13E, to the back frame 12 of the two-seater seatback 10 by the pivot shaft 13G to be rotatable in forward and rearward directions relative thereto. The armrest 13 is configured so that the entire surface thereof is covered with the arm pad 13P and the arm cover 13F, and thus a load can be alleviated and supported when the armrest 13 is accommodated into the receiving recess 11 so that a back resting load is exerted thereon and also when the armrest 13 is spread from the receiving recess 11 so that a load caused by placing an elbows thereon is exerted thereon.

Also, the armrest 13 is configured so that the distal end surface portion 13C, in which the cup holder 13B is equipped and of which a part is exposed, is likewise covered with the arm pad 13P and the arm cover 13F. Specifically, the arm pad 13P and the arm cover 13F as described above are provided to surround the frame portion 13B2 of the cup holder 13B, which is exposed from the distal end surface side 13C of the armrest 13, from an outer peripheral side thereof, and also provided to be more expanded than the frame portion 13B2 so that the frame portion 13B2 is formed at a recessed location thereof. Thus, the distal end surface portion 13C of the armrest 13 has a recessed portion 13D formed in a middle part thereof surrounded by the arm pad 13P and the arm cover 13F to be recessed so that the frame portion 13B2, the holder portion 13B3 and the pushing button 13B 1 of the armrest 13 are flushed with each other.

Also, as shown in FIG. 1, on a surface part of the armrest 13 on which a back resting load is exerted (surface part exposed from the front side when being accommodated in the receiving recess 11), the strip-shaped band 13A is attached to be bridged in a width direction in such a state that the band 13A is flushed and tightly contacted with the surface part. The band 13A is in a state where both ends thereof are respectively sewn to both lateral sides (arm cover 13F) of the armrest 13. The band 13A is intended to serve as a grip when the armrest 13 is pulled-out from the receiving recess 11. Thus, when the armrest 13 is pulled-out from the receiving recess 11, the band 13A is operated in such a manner that the band 13A is grasped and pulled forward by a hand while the arm cover 13F or the arm pad 13P is pressed and bent by the hand, thereby pulling-out and titling the armrest 13 from the receiving recess 11 forward (see FIG. 2).

Next, a configuration of the stopper structure 20 for holding the armrest 13 in the receiving recess 11 of the two-seater seatback 10 will be described below. As shown in FIGS. 4 and 6 to 10, the stopper structure 20 includes a protrusion piece 21 provided to be embedded in the ceiling surface portion 11A of the receiving recess 11 of the two-seater seatback 10, a plane-shaped supporting plate 22 for supporting the protrusion piece 21 from a back side thereof, a plane-shaped cotton fabric 23 covering the protrusion piece 21 from a front side thereof.

The stopper structure 20 is configured so that the protrusion piece 21, the supporting plate 22 and the cotton fabric 23, which are components thereof, are integrally sewn with each other and then sewn to a back surface part of the component piece 14A of the back cover 14 intended to cover the ceiling surface portion 11A of the receiving recess 11. Thus, the stopper structure 20 is provided to be sandwiched between the component piece 14A of the back cover 14 and the back pad 15 at the back side thereof. Herein, the cotton fabric 23 corresponds to a 'cushion member' of the present invention.

Figure 9:
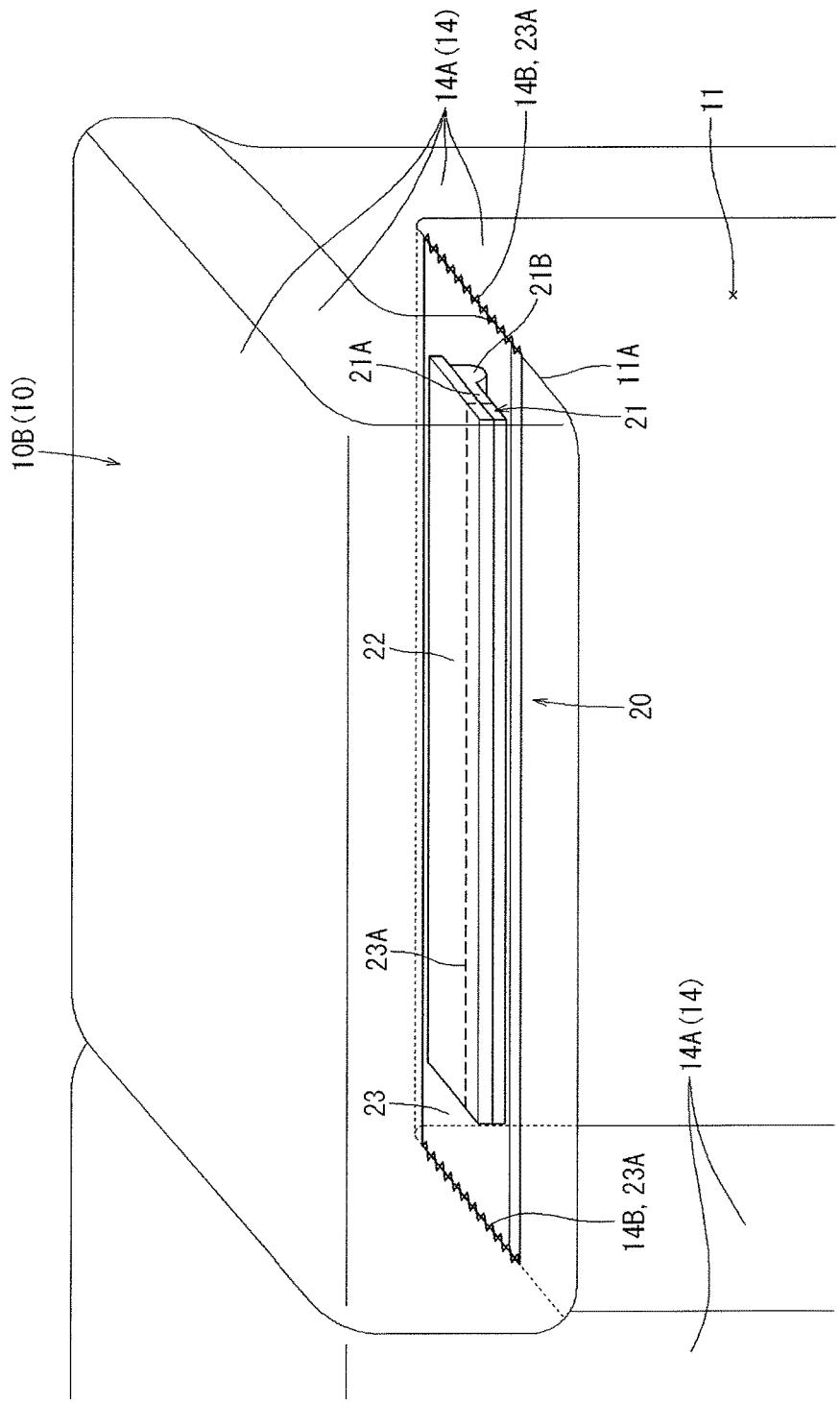
FIG. 9 is a perspective view showing a region where the stopper structure is disposed, as viewed from an upper side thereof.
Figure 10:
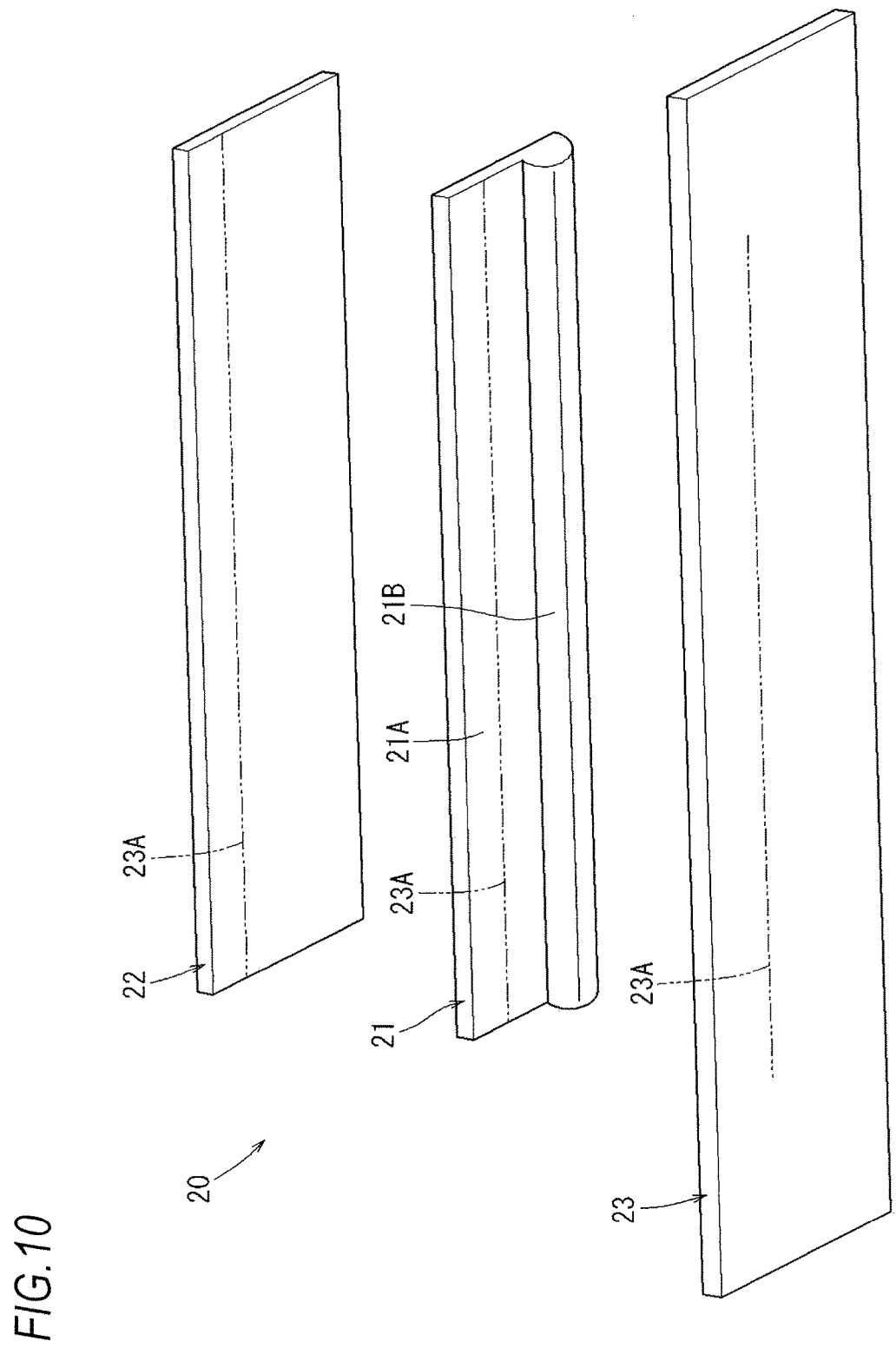
FIG. 10 is an exploded perspective view of the stopper structure.

The protrusion piece 21, which is formed by a resin member such as polypropylene which is harder than the back pad 15 or the arm pad 13P, is formed to have a rectangular plate-shaped flat plate portion 21A and a stripe-shaped beading 21B protruding from one side of the flat plate portion 21A in a cross-sectional shape of a half sphere (see FIG. 10). As shown in FIGS. 4 and 6 to 9, the protrusion piece 21 is provided so that a longitudinal direction thereof, along which the beading 21B extends, corresponds to the seat width direction and the beading 21B is oriented to protrude downward. A back surface (upper surface in an accommodated state) of the protrusion piece 21 is a flat surface (see FIGS. 7 and 10).

Specifically, the protrusion piece 21, as shown in FIGS. 6 and 9, is provided so that, in a state where the protrusion piece 21 is oriented so that the beading 21B is formed on a rear edge of the flat plate portion 21A, the beading 21B is provided in a region of the middle part, in a width direction, of the ceiling surface portion 11A of the receiving recess 11 and is provided close to an edge of a deep side thereof (back side of the seat). Herein, a protrusion shape formed by the beading 21B corresponds to a 'protrusion shape' of the present invention.

The supporting plate 22 is formed by a member, such as pressed felt or foamed polypropylene resin sheet, which is harder than the back pad 15 or the arm pad 13P. As shown in FIG. 10, the supporting plate 22 is formed in a shape of a rectangular plate far larger than the back surface of the protrusion piece 21, and is placed below the back surface of the protrusion piece 21 so that a middle part thereof is contacted with the back surface of the protrusion piece 21. As shown in FIG. 9, the supporting plate 22 is formed to have a width length shorter than a width length of the ceiling surface portion 11A of the receiving recess 11.

Figure 7:
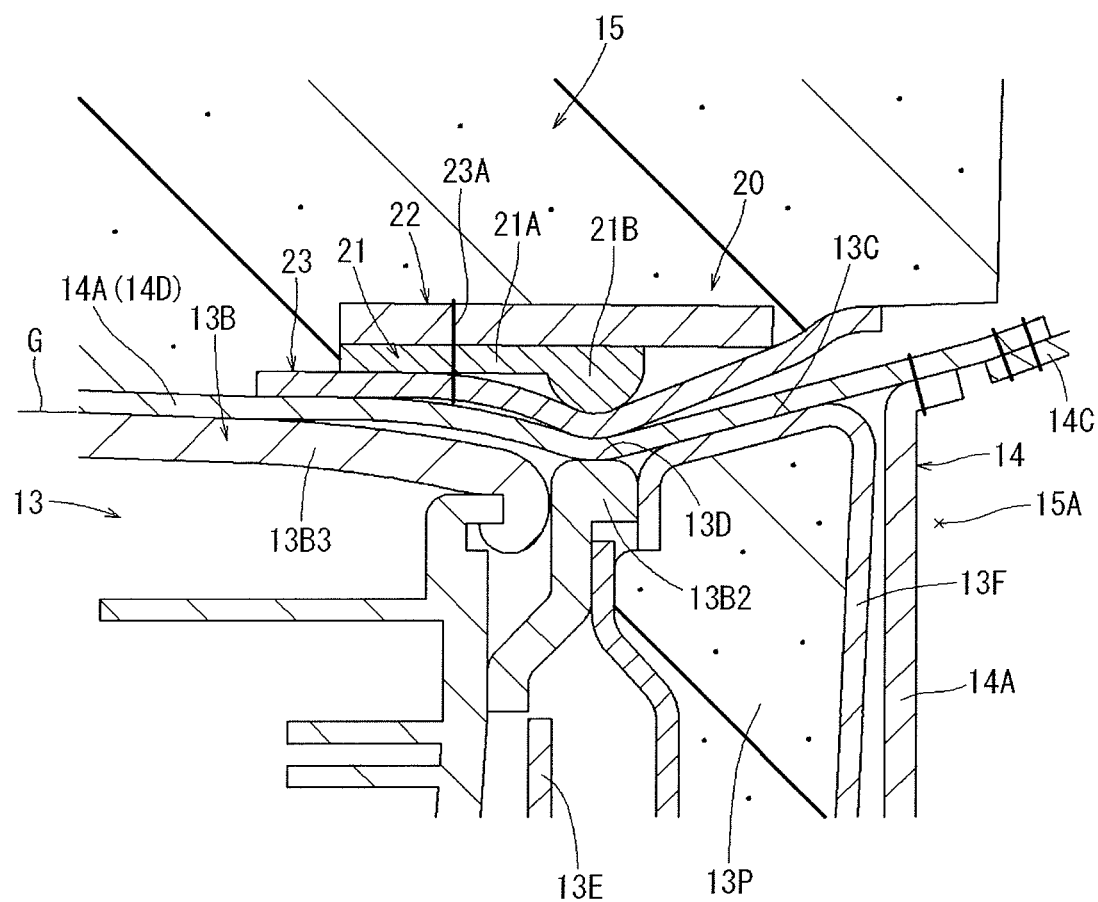
FIG. 7 is an enlarged view of a main part in FIG. 6.
Figure 8:
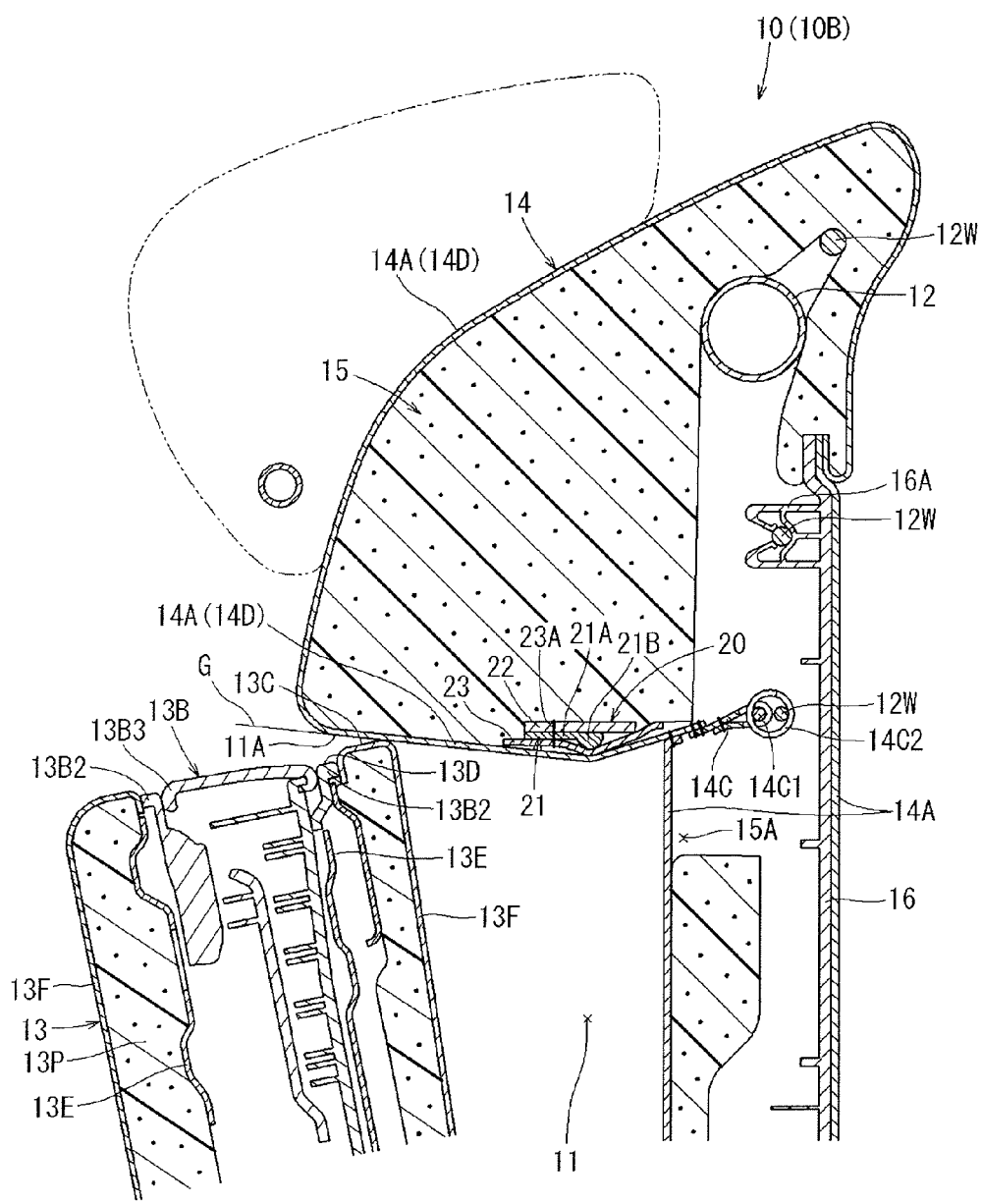
FIG. 8 is a sectional view showing a state where the armrest (tiltable unit) is tilted forward from the state of FIG. 6.

As shown in FIGS. 6 to 8, the cotton fabric 23 is formed of a material, such as thick carpet material, which allows the protrusion shape of the beading 21B to be widely and evenly dispersed in an in-plane direction of the back cover 14 so that the protrusion shape of the beading 21B of the protrusion piece 21 does not markedly stand out as a stripe-shaped highlighted portion on the surface of the back cover 14. The cotton fabric 23, as shown in FIG. 10, is formed to have a plane shape far larger than the protrusion piece 21 or the supporting plate 22 and, as shown in FIG. 9, is integrally sewn with the protrusion piece 21 and the supporting plate 22 so that a sewing line traverses the middle location, in a front and rear direction, of the flat plate portion 21A of the protrusion piece 21 along a width direction thereof in a state where each of the protrusion piece 21 and the supporting plate 22 is set on the middle part thereof. Thus, the protrusion piece 21 is integrally sewn with the cotton fabric 23 and the supporting plate 22 while being sandwiched between the cotton fabric 23 and the supporting plate 22 on front and back sides thereof (see FIG. 7).

As shown in FIG. 9, the cotton fabric 23, which is formed to have a width length longer than a width length of the ceiling surface portion 11A of the receiving recess 11, is configured so that in a state where the cotton fabric 23 is overlapped with the back surface of the back cover 14 covering the ceiling surface portion 11A of the receiving portion 11, both side edges thereof in the width direction are sewn with seams 14B (sewn portion) between the component piece 14A of the back cover 14, which is intended to cover the ceiling surface portion 11A of the receiving recess 11, and each component piece 14A connected to both sides thereof (seams 23A, see FIG. 9). Thus, the stopper structure 20 is integrally sewn to the back surface part of the component piece 14A of the back cover 14 intended to cover the ceiling surface portion 11A of the receiving recess 11.

As shown in FIG. 8, the stopper structure 20 is provided to be aligned with a predetermined location on the middle part, in the width direction, of the ceiling surface portion 11A of the receiving recess 11, which is located close to the edge of the deep side thereof (back side) by an operation in which the back cover 14 is covered on the surface of the back pad 15 and then stretched as described above. Specifically, although the beading 21B of the protrusion piece 21 of the stopper structure 20 is arranged at a location close to the edge of the deep side of the ceiling surface portion 11A upon stretching of the back cover 14, since the flat plate portion 21A of the protrusion piece 21 is formed in a region which is located more forward than the beading 21B, the suspending fabrics 14C of the back cover 14 is not caught by the protrusion piece 21 upon an operation of suspending the suspending fabrics 14C rearward, and thus, the operation of suspending the suspending fabrics 14C can be properly performed.

By stretching of the back cover 14, the stopper structure 20, as shown in FIG. 8, is provided so that the beading 21B of the protrusion piece 21 is supported by an elastic force of the back pad 15 via the supporting plate 22 and thus forms a gentle protrusion shape, which protrudes further than a general plane G of the ceiling surface portion 11A of the receiving recess 11, on the ceiling surface portion 11A. Specifically, the protrusion shape obtained by the beading 21B of the protrusion piece 21 does not partially protrude in a narrow stripe shape, but protrudes to be widely and evenly dispersed in an in-plane direction of the back cover 14, due to a cushioning structure of the cotton fabric 23 interposed between the protrusion piece 21 and the back cover 14, a stretching force of the back cover 14, or a cushioning structure of the cover pad 14D (not shown) laminated on the back surface part of the back cover 14. Thus, the protrusion shape obtained by the beading 21B is provided in a state in which the protrusion is hardly visible in appearance without causing a highlighted portion on the surface of the ceiling surface portion 11A of the back cover 14.

As shown in FIG. 8, the stopper structure 20 as described above is provided so that before the armrest 13 is accommodated into the receiving recess 11, the beading 21B of the protrusion piece 21 protrudes more downward than the general plane G of the ceiling surface portion 11A of the receiving recess 11. Also, when the armrest 13 is pressed and accommodated into the receiving recess 11 so that the beading 21B of the protrusion piece 21 is interfered with the distal end surface portion 13C of the armrest 13 oriented upward in the figures and, as a result, the armrest 13 is fully pressed into the receiving recess 11, the stopper structure 20 becomes in a state where the beading 21B has entered the recessed portion 13D formed in the distal end surface portion 13C as shown in FIGS. 6 and 7. Thus, the armrest 13 becomes in a state where a movement thereof in a direction of coming out from the receiving recess 11 forward is limited by the beading 21B which has entered the recessed portion 13D, and thus is kept fixed in place in the receiving recess 11.

Specifically, when the armrest 13 is pressed into the receiving recess 11 to be interfered with the distal end surface portion 13C of the armrest 13, the stopper structure 20 allows a receiving movement of the armrest 13 while pressing and bending the back pad 15, which supports the protrusion piece 21 from the back side thereof, and the arm pad 13P, which constitutes the distal end surface portion 13C of the armrest 13 interfered with the protrusion piece 21. Also, when the armrest 13 has been fully pressed into the receiving recess 11 so that the beading 21B of the protrusion piece 21 enters the recessed portion 13D of the distal end surface portion 13C of the armrest 13, the stopper structure 20 allows the back pad 15 or the arm pad 13 to be relaxed from such a pressed and bent state and thus to be returned to an initial state before being pressed and bent. Due to this configuration, since the back pad 15 and the arm pad 13P are not pressed and bent for a long time, an indentation by a pressing force of the protrusion piece 21 is not created on the surface of the armrest 13 and the ceiling surface portion 11A of the receiving recess 11.

The armrest 13 held in the receiving recess 11 is tilted to be released from a state where the armrest 13 is interfered with the beading 21B of the protrusion piece 21 to a spread position as described above with reference to FIG. 2, as a force for pulling-out the armrest 13 from the receiving recess 11 is exerted against a locking force exerted by the beading 21B of the protrusion piece 21.

As described above, the seat 1 of the present embodiment is configured to have the armrest 13 (tiltable unit) provided in the receiving recess 11 formed in the seatback 2 and adapted to be usable while being titled forward from the receiving recess 11 and the stopper structure 20 for maintaining the armrest 13 accommodated in the receiving recess 11. The stopper structure 20 is configured so that the protrusion piece 21 provided on an inner peripheral part (ceiling surface portion 11A) of the receiving recess 11 is pressed against an outer peripheral part (distal end surface portion 13C) of the armrest 13 to apply a locking force for holding the armrest 13 in the receiving recess 11. The protrusion piece 21 is arranged to be sandwiched between the back cover 14 (seat cover), which is stretched to cover the general plane G of the ceiling surface portion 11A of the receiving recess 11 to which the protrusion piece 21 is provided, and the back pad 15 (seat pad) covered with the back cover 14, and the beading 21B forms the protrusion shape protruding further than the general plane G and pressed against the outer peripheral part of the armrest 13.

Due to this configuration, the protrusion shape of the beading 21B of the protrusion piece 21 becomes even by a shape of the back cover 14 stretched on a surface thereof, so that the protrusion shape hardly becomes a shape partially protruding with respect to the exterior. Therefore, the stopper structure 20 can be configured to hardly damage the corresponding member (armrest 13) and also to provide a fine appearance when being exposed to the exterior.

Also, the flexible plane-shaped cotton fabric 23 (cushion member) extending in an in-plane direction of the general plane G is provided to be interposed between the back cover 14 and the protrusion piece 21. Due to this configuration, a pressing force applied on the back cover 14 by the protrusion shape of the beading 21B of the protrusion piece 21 can be widely and evenly dispersed in the in-plane direction of the back cover 14 by the plane-shaped cotton fabric 23. Therefore, the stopper structure 20 can be more effectively configured to hardly damage the corresponding member (armrest 13) and also to provide a fine appearance (to hardly exhibit a highlighted portion) when being exposed to the exterior.

Further, the protrusion piece 21 is sewn to the cotton fabric 23 and the cotton fabric 23 is sewn together to the seams (14B) between the component pieces 14A of the back cover 14 (seams 23A; see FIG. 9). Due to this configuration, the protrusion piece 21 and the cotton fabric 23 can be sewn to the back cover 14 by a small number of seams and also seams for fixing the protrusion piece 21 to the back cover are not separately exposed, thereby providing an enhanced appearance for the back cover 14. In addition, due to the configuration, the protrusion piece 21 is positioned at a location (middle location) remote from the seams 14B between component pieces 14A of the back cover 14 without increasing the number of seams, thereby preventing the back cover 14 from being excessively stretched. Also, because a structure, in which the protrusion piece 21 is directly fixed to the back cover 14, is not taken, no hole for fixing the protrusion piece 21 to the back cover 14 needs to be formed, thereby achieving the reduced number of steps and an enhanced appearance. In addition, because the protrusion piece 21 or the cotton fabric 23 is sewn to the back cover 14, the protrusion piece 21 or the cotton fabric 23 can be easily positioned with respect to the back cover 14 and also can be simply handled as one component integrated with the back cover 14. On the other hand, the cover pad 14D (not shown) provided on the back surface part of the back cover 14 may be adapted to serve as the 'cushion member' of the present invention for widely dispersing the protrusion shape of the beading 21B of the protrusion piece 21 in the in-plane direction.

Further, the protrusion piece 21 is formed by a resin component harder than the back pad 15, and a surface part on the back side of the protrusion piece 21 facing the back pad 15 is formed in a plane shape more widely extending in the in-plane direction (of the general plane G) than the protrusion shape of the beading 21B. Due to this configuration, even if the protrusion piece 21 is formed by the resin component and thus is hard, the protrusion piece 21 can become even to hardly become a shape partially protruding with respect to the exterior due to the shape of the back cover 14 stretched on the surface thereof. In addition, even if the protrusion piece 21 is formed of a hard material as described above, a wide surface part on the back side thereof can be supported by the back pad 15 while being widely surface-contacted with the back pad 15, and therefore the protrusion piece 15 is hardly sunk into the back pad 15, thereby exhibiting a stable and strong locking force.

Further, the stopper structure 20 is provided between a top surface portion (distal end surface portion 13C) of the armrest 13 in the accommodated state and the ceiling surface portion 11A of the receiving recess 11 facing the top surface portion (distal end surface portion 13C). Due to this configuration, the stopper structure 20 is provided at a location remotest from a pivot point (pivot shaft 13G) for titling of the armrest 13, and therefore a holding force for holding the armrest 13 in the accommodated state can be strongly exhibited.

In addition, the protrusion piece 21 is provided to the inner peripheral part of the receiving recess 11. Due to this configuration, the protrusion piece 21 is configured to protrude from the inner peripheral part of the receiving recess 11 of the seatback 2. Therefore, as compared to a case where the protrusion piece 21 is provided to the armrest 13, the protrusion piece 21 can be formed at a location where the protrusion piece 21 is not more exposed to view (location where the appearance is not degraded even if the armrest 13 is spread) and also can be configured to have little chance of being touched by a user.

Also, the protrusion piece 21 is provided to a region at a deep side (back side of the seat) of the receiving recess 11. Due to this configuration, when a seater leans against the seatback 2, the seater hardly feels a foreign matter sensation caused by the protrusion piece 21. In addition, when the armrest 13 is accommodated into the receiving recess 11, a region, on which a locking force (resistive force) by the stopper structure 20 is exerted, becomes the last region in the accommodating operation. Therefore, an operation for titling the armrest 13 from the receiving recess 11 or accommodating the armrest 13 into the receiving recess 11 can be more simply performed.

In addition, the cup holder 13B (predetermined equipment) is provided to the outer peripheral part of the armrest 13 to be exposed to the exterior, and the protrusion piece 21 is configured so that the protrusion shape enters the recessed portion 13D on a boundary between the armrest 13 and the cup holder 13B formed on the outer peripheral part of the armrest 13 and thus exerts a locking force. Due to this configuration, by using a configuration of the cup holder 13B provided to be exposed on the outer peripheral part of the armrest 13, it is possible to prevent an indentation from being created on the armrest 13 by the locking force exerted by the protruding piece 21.

In the foregoing, although the embodiment of the present invention has been described with reference to one example, the invention can be embodied as various modes, other than the foregoing embodiment. For example, the 'vehicle seat' of the present invention may be applied to any seats other than a rear seat of automobiles, and additionally may be applied to seats employed in any vehicles, such as trains, other than automobiles and also may be widely applied to any seats provided in any various vehicles, such as aircrafts or ships.

In addition, the 'tilting unit' of the present invention may be any one which can be used by being tilted forward from the receiving recess formed in the seatback, and accordingly, may be provided as other functional units, such as a table, other than the armrest as illustrated in the foregoing embodiment. Also, the 'stopper structure' may have any configuration, as long as a protrusion piece provided to either one of an inner peripheral part of the receiving recess formed in the seatback and an outer peripheral part of the tiltable unit is pressed against the other to apply a locking force for holding the tiltable unit in the receiving recess. Accordingly, the protrusion piece may be provided to a lateral surface portion or a bottom surface portion of the receiving recess, other than the ceiling surface portion of the receiving recess as illustrated in the foregoing embodiment, and also may be provided to the armrest. In addition, the protrusion piece may be provided to both of them.

Further, the protrusion shape of the 'protrusion piece' is not limited to the protrusion shape of the beading as illustrated in the foregoing embodiment, and thus can employ various protrusion shapes. In addition, the protrusion shape of the protrusion piece may be provided to be widely dispersed at a plurality of locations so that the protrusion shape is not localized. Also, the 'protrusion piece' may be coupled to the seat cover or the seat pad by adhesion. Also, in the foregoing embodiment, although the 'predetermined equipment provided to the outer peripheral part of the tiltable unit to be exposed to the exterior' of the present invention has been illustrated as a cup holder, the equipment may be other equipments, such as a drawer. In addition, the tiltable unit may have no equipment.

What is claimed is:

1. A vehicle seat having a tiltable unit which is provided in a receiving recess formed in a seatback in a first position and is configured to be tilted forward to a second position from the receiving recess, the vehicle seat comprising:
    a stopper structure configured to keep the tiltable unit to be accommodated in the receiving recess when the tiltable unit is in the first position,
    wherein the stopper structure includes a protrusion piece provided to one of an inner peripheral part of the receiving recess and an outer peripheral part of the tiltable unit, such that when the tiltable unit is in the first position, the protrusion piece is pressed against the other of the inner peripheral part of the receiving recess and the outer peripheral part of the tiltable unit to apply a locking force between the inner peripheral part of the receiving recess and the outer peripheral part of the tiltable unit for holding the tiltable unit in the receiving recess,
    wherein the protrusion piece is interposed between a seat cover and a seat pad,
    wherein the seat cover is stretched to cover a general plane of the one of the inner peripheral part of the receiving recess and the outer peripheral part of the tiltable unit to which the protrusion piece is provided, and to cover the seat pad,
    wherein the protrusion piece forms a protrusion shape protruding further than the general plane and protrudes towards the other of the inner peripheral part of the receiving recess and the outer peripheral part of the tiltable unit,
    wherein the stopper structure further includes a flexible plane-shaped cushion member separate and distinct from the seat cover and the protrusion piece, the flexible plane-shaped cushion member extending in an in-plane direction of the general plane and interposed between the seat cover and the protrusion piece, and
    wherein the protrusion piece is made of a different material than the seat pad.

2. The vehicle seat according to claim 1, wherein the protrusion piece is sewn to the cushion member and the cushion member is held together by a seam between component pieces of the seat cover.

3. The vehicle seat according to claim 1, wherein the protrusion piece is formed by a resin component harder than the seat pad, and
    wherein a surface part on a back side of the protrusion piece facing the seat pad is formed in a plane shape more widely extending in an in-plane direction of the general plane than the protrusion shape.

4. The vehicle seat according to claim 1, wherein the stopper structure is provided between a top surface portion of the tiltable unit in an accommodated state and a ceiling surface portion of the receiving recess facing the top surface portion.

5. The vehicle seat according to claim 1, wherein the protrusion piece is provided to the inner peripheral part of the receiving recess.

6. The vehicle seat according to claim 5, wherein the protrusion piece is provided to a region that is closer to a back surface of the receiving recess that is parallel with the seat back than it is to an opening at a front surface of the seatback.

7. The vehicle seat according to claim 5, wherein a predetermined equipment is provided to the outer peripheral part of the tiltable unit, the predetermined equipment configured to be exposed to an exterior of the tiltable unit in response to a predetermined operation, and
    wherein the protrusion piece is configured so that the protrusion shape is accommodated in a recessed portion of the outer peripheral part of the tiltable unit, the recessed portion being provided on a boundary between a surface portion of the outer peripheral part of the tiltable unit and the predetermined equipment to apply the locking force.

8. The vehicle seat according to claim 1, wherein the other of the inner peripheral part of the receiving recess and the outer peripheral part of the tiltable unit includes a crevice in which the protrusion piece is accommodated when the tiltable unit is in the first position.

9. The vehicle seat according to claim 8, wherein the crevice is provided at a boundary between a surface of an extractable equipment stored in the tiltable unit and a portion of the outer peripheral part of the tiltable unit that surrounds the extractable equipment.

* * * * *